US008306026B2

(12) United States Patent
Anjum et al.

(10) Patent No.: US 8,306,026 B2
(45) Date of Patent: Nov. 6, 2012

(54) LAST HOP TOPOLOGY SENSITIVE MULTICASTING KEY MANAGEMENT

(75) Inventors: Farooq Anjum, Somerset, NJ (US); Abhrajit Ghosh, Edison, NJ (US)

(73) Assignees: Toshiba America Research, Inc., Washington, DC (US); Telcordia Technologies, Inc., Piscataway, NJ (US)

( * ) Notice: Subject to any disclaimer, the term of this patent is extended or adjusted under 35 U.S.C. 154(b) by 1399 days.

(21) Appl. No.: 11/532,806

(22) Filed: Sep. 18, 2006

(65) Prior Publication Data

US 2007/0140245 A1 Jun. 21, 2007

Related U.S. Application Data

(60) Provisional application No. 60/750,736, filed on Dec. 15, 2005.

(51) Int. Cl.
*H04L 12/28* (2006.01)
(52) U.S. Cl. ............... 370/390; 370/432; 713/163
(58) Field of Classification Search .......... 370/254, 370/255, 256, 310, 312, 328, 338, 351, 389, 370/390, 400, 408, 431, 432; 713/150, 162, 713/163
See application file for complete search history.

(56) References Cited

U.S. PATENT DOCUMENTS

| | | | | |
|---|---|---|---|---|
| 6,442,688 | B1 * | 8/2002 | Moses et al. | 713/158 |
| 7,434,046 | B1 * | 10/2008 | Srivastava | 713/163 |
| 7,853,785 | B1 * | 12/2010 | Thurman et al. | 713/158 |
| 2002/0104001 | A1 * | 8/2002 | Lotspiech et al. | 713/163 |
| 2003/0088696 | A1 * | 5/2003 | McCanne | 709/238 |
| 2003/0227931 | A1 * | 12/2003 | Chen et al. | 370/408 |
| 2004/0054899 | A1 * | 3/2004 | Balfanz et al. | 713/168 |
| 2005/0039025 | A1 * | 2/2005 | Main et al. | 713/182 |
| 2005/0044356 | A1 * | 2/2005 | Srivastava et al. | 713/163 |
| 2005/0220304 | A1 * | 10/2005 | Lenoir et al. | 380/255 |
| 2006/0098607 | A1 * | 5/2006 | Zeng et al. | 370/338 |

OTHER PUBLICATIONS

D. Wallner, Key Management for Multicast: Issues and Architectures, Jun. 1999, pp. 1-22, The Inernet Society, USA.
Banerjee, S.; Bhattacharjee, B.; , "Scalable secure group communication over IP multicast," IEEE Journal on Selected Areas in Communications, vol. 20, No. 8, pp. 1511-1527, Oct. 2002.
Wong, C. K., Gouda, M., and Lam, S. S. 1998. Secure group communications using key graphs. In Proceedings of the ACM SIGCOMM '98 Conference on Applications, Technologies, Architectures, and Protocols for Computer Communication (Vancouver, British Columbia, Canada, Aug. 31-Sep. 4, 1998). M. Steenstrup, Ed. SIGCOMM '98. ACM, New York, NY, 68-79.
Chang, I.; Engel, R.; Kandlur, D.; Pendarakis, D.; Saha, D.; , "Key management for secure Internet multicast using Boolean function minimization techniques," INFOCOM '99. Eighteenth Annual Joint Conference of the IEEE Computer and Communications Societies. Proceedings. IEEE , vol. 2, No., pp. 689-698 vol. 2, Mar. 21-25, 1999.

(Continued)

*Primary Examiner* — Nittaya Juntima
*Assistant Examiner* — Khoa Huynh
(74) *Attorney, Agent, or Firm* — Westerman, Hattori, Daniels & Adrian, LLP (57) ABSTRACT

A system and method of managing multicast key distribution that includes associating a multicast address with each internal node of the key tree, wherein the key tree is created based on the last hop topology.

10 Claims, 6 Drawing Sheets

Key tree and topology

OTHER PUBLICATIONS

Canetti, R.; Garay, J.; Itkis, G.; Micciancio, D.; Naor, M.; Pinkas, B.; ,"Multicast security: a taxonomy and some efficient constructions," INFOCOM '99. Eighteenth Annual Joint Conference of the IEEE Computer and Communications Societies. Proceedings. IEEE , vol. 2, No., pp. 708-716 vol. 2, Mar. 21-25, 1999.

Dinsmore, P.T.; Balenson, D.M.; Heyman, M.; Kruus, P.S.; Scace, C.D.; Sherman, A.T.; , "Policy-based security management for large dynamic groups: an overview of the DCCM project," DARPA Information Survivability Conference and Exposition, 2000. DISCEX '00. Proceedings , vol. 1, No., pp. 64-73 vol. 1, 2000.

Lazos, L.; Salido, J.; Poovendran, R.; , "VP3: using vertex path and power proximity for energy efficient key distribution," Vehicular Technology Conference, 2004. VTC2004—Fall. 2004 IEEE 60th , vol. 2, No., pp. 1228-1232 vol. 2, Sep. 26-29, 2004.

* cited by examiner

Figure 1: Key tree and topology

Figure 2: Key tree and topology

LAST HOP TOPOLOGY SENSITIVE MULTICASTING KEY MANAGEMENT

The present application claims priority under 35 U.S.C. 119 to U.S. Provisional Application Ser. No. 60/750,736, entitled Last Hop Topology Sensitive Key Management, to Farooq Anjum, et al., filed on Dec. 15, 2005, the entire disclosure of which is incorporated herein by reference.

BACKGROUND

1. Field of the Invention

The present application relates to networking and, in some preferred embodiments, to methods and systems for secure multicasting and/or for managing keys for encryption and/or decryption, such as, e.g., related to multicast key distribution and/or the like.

2. General Background Discussion

Networks and Internet Protocol

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals. In this disclosure, the terminology network is used broadly and includes individual networks and multiple networks networked together.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, Each host device on the network has at least one IP address that is its own unique identifier.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer.

Wireless Networks

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3 G cellular devices, 2.5 G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (i.e. outside mobile IP), typically, routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Multi-Hop Networking

In, for example, a packet-switching network, a hop is the trip a data packet takes from one node (e.g., router or intermediate point) to another node in the network. On the Internet (or another network that uses, e.g., TCP/IP), the number of hops a packet has taken toward its destination (called the "hop count") may be kept in a packet header. Over the Internet and in some other networks, such as, e.g., in some mesh networks or the like, a multi-hop network is employed that may follow a multi-hop path between the source and the destination nodes, such as, e.g., by hopping between routers, etc., along the communication path.

In packet-switched networks such as the Internet, a router can be, e.g., a device or software in a computer that determines the next network point to which a packet should be forwarded to (e.g., to reach is ultimate destination). The router may be, e.g., connected to two or more networks and the router may decide which way to send each information packet based on its current understanding of the state of the network(s) it is connected to. A router can be located at, e.g., a gateway (e.g., where one network meets another). A router can also be included as part of a network switch.

A router may, in some examples, create or maintain a table of the available routes and their conditions and use this information along with, e.g., distance and cost algorithms to determine the best route for a given packet. In some common examples, a packet may travel through a number of network points with routers before arriving at its destination. Routing is typically a function associated with the network layer (i.e., layer 3) of the OSI model. In that regard, a layer-3 switch is a switch that can perform routing functions.

Multicast Key Distribution Problem

In multicasting, a distribution problem occurs in relation to security keys. In this section, the discussion of problems, etc., related to certain technologies is based on the present inventors' knowledge and is not submitted as representing knowledge within the art.

For background reference, multicasting involves transmitting a communication from a sender to multiple receivers on a network. Along with anycast and unicast (e.g., communication between a single sender and a single receiver over a network), multicast is one of the packet types in, e.g., the Internet Protocol Version 6 (IPv6). By way of example, multicast is supported through certain wireless data networks as part of, e.g., the Cellular Digital Packet Data technology. For further reference, keys include, e.g., a session key that is an encryption and decryption key. This key is randomly generated for the security of a communications session between, e.g., two devices or nodes. Session keys are sometimes referred to as symmetric keys (the same key can be used for both encryption and decryption). A session key may be derived, for example, from a hash value. During a session, the key is transmitted along with the message content. And, it is encrypted with a public key of the recipient. For security purposes, session keys are changed frequently.

The multicast key distribution problem focuses on ensuring that all the valid receivers of a multicast group possess the keys needed to decrypt the information. One approach to solve this problem is to assume the presence of an entity called the key server (KS) that distributes the group key to all users. But then, the problem faced by the key server is complicated on account of the dynamics associated with a multicast group where members can join as well as leave the group. In order to securely update the Session Encryption Key (SEK), typically each member would need to possess additional keys called the Key Encrypting Keys (KEK). Thus, a multicast key distribution problems focuses on ensuring that all the valid receivers possess both the right SEK as well as the KEKs and that these are changed in response to the group dynamics.

When dealing with large multicast groups, the service rendered by the key server (KS) needs to be designed such that it is scalable with respect to frequent key changes. After a member joins the group, the key server can send the new group key via unicast to the new member and via multicast to the existing members. The former is sent encrypted using the key shared between the joining member and the key server while the latter is encrypted using the previous group key. Similarly, after a member leaves the group, the new group key must be securely distributed by encrypting it with individual keys since the previous group key cannot be used. However, this simple approach is not scalable. The key graph approach [see, e.g., References 2, 3] has been proposed for scalable rekeying. In this approach, besides the group key and its individual key, each user is given several auxiliary keys. These auxiliary keys are used to facilitate rekeying. Key graph is a data structure that models user-key and key-key relationships. One important type of key graph is the key tree where key-key relationships are modeled as a tree.

This problem of building efficient key trees has received attention lately [see, e.g., References 2, 3]. The topology of the network will have to be considered while building the key trees. The network topology can be considered to be the combination of the last hop and the internal network. The last hop corresponds to the link between the user, who is the consumer of the information, and the router to which the user connects. The internal network corresponds to the various routers that receive and forward information belonging to this multicast group. A protocol such as, e.g., IGMP is typically used on the last hop while protocols such as, e.g., PIM-SM, CBT, etc., are typically used on the internal network. There has been some effort towards considering the topology of the internal network while building key trees [see, e.g., Reference 1]. On the other hand, there has been essentially no focus on the last hop while building key trees. However, the present inventors have found that the characteristics of the last hop also need to be accounted for while building the key tree. These characteristics include features such as, e.g., the ability to multicast, the ability to form a subnet, etc. These features will impact both performance in the form of the number of messages that will be sent on the last hop and security in the form of the revocation messages that reach endpoints for which they are not destined. These factors are especially important in cases where the last hop network involves wireless links, such as, e.g., for cellular networks, WLAN networks, etc.

In Reference 1, below, the authors consider the topology of an entire network. But the topology is considered only for building the tree. Leaf nodes of the tree are assumed to correspond to the multicast member. In many cases, the leaf nodes correspond to the gateways. So any member in the subnet would lead to traffic on the subnet. Thus, the approaches within the present application are complimentary to the approach in Reference 1.

Approaches that assume only a single trusted key server are proposed in References 1, 2 and 3. In these approaches, a user is given some auxiliary keys, besides the group key and the individual key, to reduce the server cost for rekeying. These approaches have been mainly focused on reducing the server costs for individual rekeying. In this regard, Reference 2 provides one of the earliest approaches to efficient member revocations using logical key heirarchies. In this approach, the onus of distributing the group key as well as all the auxiliary keys rests on the key server entity. References 6 and 7 refine the approach by allowing the members to autonomously compute some of the auxiliary keys—thus, reducing the distribution overhead. The messaging overhead in all cases is logarithmic in the number of members.

Reference 4 addressed the problem of batch rekeying and proposed using boolean function minimization techniques to facilitate batch rekeying. Their approach, however, has a collusion problem—namely, two users can combine their knowledge of keys to continue reading group communications, even after they leave the group. Reference 5 addressed the problem of keeping the key tree balanced. Their approach essentially was to add joins at the shallowest leaf nodes of the tree and to re-structure the tree periodically. Reference 5 also briefly described an algorithm for batch rekeying, in which joins replace leaves one by one, and if there are still extra joins, they are added to the shallowest leaf nodes of the tree one by one. Reference 5's objective is to keep the key tree balanced. However, in the more preferred embodiments described herein, the schemes assume the server has the capability to balance the key tree (e.g., to the extent possible).

In References 8 and 9, the authors have looked at the problem of making the key tree sensitive to the network topology in the context of ad-hoc networks. The focus in this case, however, is on key distribution with a focus on energy efficiency.

[Reference 1] S. Banerjee and B. Bhattacharjee, "Scalable Secure Group Communication over IP Multicast", IEEE JSAC Sp. Issue on network support for group communication.

[Reference 2] D. Wallner, E. Harder, and Ryan Agee. Key Management for Multicast: Issues and Architectures RFC 2627, IETF, June 1999.

[Reference 3] Chung Kei Wong, Mohamed Gouda, and Simon S. Lam. Secure group communications using key graphs. In Proceedings of ACM SIGCOMM '98, September 1998.

[Reference 4] Isabella Chang, Robert Engel, Dilip Kandlur, Dimitrios Pendarakis, and Debanjan Saha. Key management for secure Internet multicast using boolean function minimization techniques. In Proceedings of IEEE INFOCOM '99, volume 2, March 1999.

[Reference 5] M. J. Moyer, J. R. Rao, and P. Rohatgi. Maintaining Balanced Key Trees for Secure Multicast, INTERNET-DRAFT, June 1999.

[Reference 6] R. Canetti, J. Garay, G. Itkis, D. Micciancio, M. Naor, and B. Pinkas. Multicast security: A taxonomy and some efficient constructions. In Proc. INFOCOM '99, New York, N.Y., March 1999.

[Reference 7] P. Dinsmore D. M. Balenson M. Meyman P. S. Kruus C. D. Scace and A. T. Sherman, "Policy-Based Security Management for Large Dynamic Groups: An Overview of the DCCM Project," Proc. DARPA Information Survivability Conf. and Exposition (DISCEX '00), pp. 64-73, January 2000

[Reference 8] L. Lazos and Radha Poovendran, "Cross-Layer Design for Energy-Efficient Secure Multicast Communications in Ad Hoc Networks," IEEE International Conference on Communications (ICC), Jun. 20-24, 2004, Paris, France.

[Reference 9] Loukas Lazos, Javier Salido, Radha Poovendran, VP3: Using Vertex Path and Power Proximity for Energy Efficient Key Distribution, Invited Paper in IEEE VTC, 2004-Fall, Los Angeles, Calif.

While a variety of systems and methods are known, there remains a need for improved systems and methods.

SUMMARY OF THE PREFERRED EMBODIMENTS

The preferred embodiments of the present invention can significantly improve upon existing methods and/or apparatuses.

The problem of multicast key distribution has not been appropriately studied with specific regard to cryptographic attacks on the key distribution process by malicious insiders. In addition, the issue of bandwidth constraints, in this context, has only recently been considered important in light of recent proposals to incorporate multicast capabilities in cellular and 3G networks (see Hauge and O. Kure, "Multicast in 3G Networks: Employment of Existing IP Multicast Protocols in UMTS", WoWMoM 02, September 2002, Atlanta, USA). The preferred embodiments described herein provide substantial and non-obvious advances over previous work; among other things, previous work had focused on the entire network topology, and not specifically on the access networks. Among other things, the preferred present solutions require less knowledge about the network infrastructure and is, thus, among other things, more efficient.

In the preferred embodiments, a new approach is employed which associates a multicast address with each internal node of the key tree. Further, the key tree itself is created based on the last hop topology. Consider a router R that connects a subnet S to the rest of the communication network. A subset TS of the group members may reside in S. For each member m in TS, R will need to subscribe to the multicast group corresponding to each node on the path between the root and the leaf representing m in the logical key tree. In this disclosure, three illustrative ways in which the key tree can be created while considering the last hop topology are described.

The present inventors have examined the problem of performing key revocations for multicast applications in a topology sensitive manner as an enhancement to previous approaches where revocations were performed agnostic of the last hop topology. In this regard, significant savings in terms of messaging overhead have been seen at the cost of additional multicast state overhead.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Introduction to the Preferred Embodiments

The preferred embodiments of the present invention can be implemented within a variety of networks employing multi-hop routing communications. For example, applicable networks can include wireless LANs (WLANs), infrastructure WLANs, independent WLANs, mesh networks, adhoc networks (such as, e.g., in military or disaster ad hoc implementations) and/or a variety of other networks employing multi-hop wireless communications, including, e.g., private networks within enterprises, public networks such as, e.g., those connected to Internet, and/or the like.

The problem of multicast key distribution has not been appropriately studied with specific regard to cryptographic attacks on the key distribution process by malicious insiders. In addition, the issue of bandwidth constraints, in this context, has only recently been considered important in light of recent proposals to incorporate multicast capabilities in cellular and 3G networks. See: M. Hauge and O. Kure, "Multicast in 3G Networks: Employment of Existing IP Multicast Protocols in UMTS", WoWMoM 02, September 2002, Atlanta, USA, the entire disclosure of which is incorporated herein by reference. Among other things, the preferred solutions herein have significant advantages as, e.g., previous work had focused on the entire network topology, and not specifically on the access networks. On the other hand, the preferred solutions described herein require less knowledge about the network infrastructure and are, among other things, necessarily more efficient.

In the preferred embodiments, the approach taken is to associate a multicast address with each internal node of the key tree. Further, the key tree itself is created based on the last hop topology. Consider a router R that connects a subnet S to the rest of the communication network. A subset TS of the group members may reside in S. For each member m in TS, R will need to subscribe to the multicast group corresponding to each node on the path between the root and the leaf representing m in the logical key tree. In this disclosure, three different illustrative ways are described in which the key tree can be created while considering the last hop topology.

Figure 2:
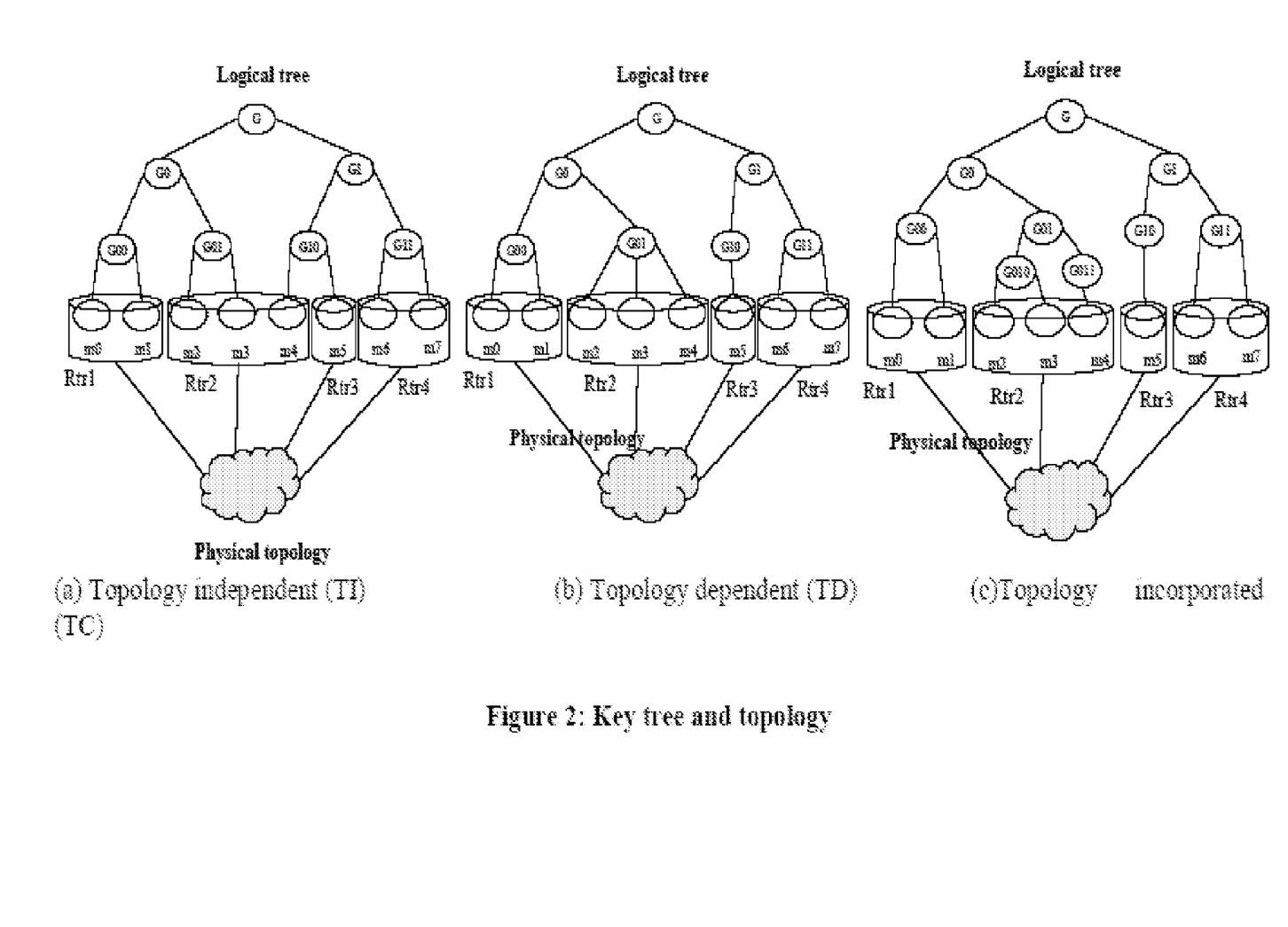
FIGS. 2(A) to 2(C) show illustrative Key Trees and Topology according to three different examples according to the present invention.

With reference to FIG. 2(A), a first illustrative scheme is shown according to a first illustrative embodiment. In this disclosure, this scheme is referred to as the topology independent (TI) scheme. In this case, the key tree is determined independent of the physical topology. However, unlike other schemes, each node of the key tree has an associated multicast address. In this regard, each router of a subnet will have to subscribe to multicast groups that correspond to the various nodes in the key tree. With reference to FIG. 2(A), in the illustrated non-limiting example, subnet 1 corresponding to router 1 has two members of the group—namely, m0 and m1. Accordingly, router 1 will have to subscribe to multicast groups G00 and G0 in addition to the multicast group G used to transmit data. Similarly, in addition to the multicast group G, router 2 belongs to multicast groups G01, G0, G10 and G1, router 3 belongs to G10 and G1, and router 4 belongs to multicast groups G11 and G1.

In this regard, it is noted that the group G is preferably used only to transmit data and to update the key when a member joins while all the rest of the multicast groups are preferably used for updating the session keys when one or more members leave the multicast group.

The number of additional multicast groups, in each case, is determined by the number of members and the depth of the key tree. There is a many-to-many correspondence between Leaf multicast addresses and routers at which members are present. For example, G10 is a leaf multicast address that is present at routers 2 and 3. Conversely, router 2 has subscriptions to two leaf multicast addresses: G01 and G10. Now, we consider an illustrative example wherein the member m1 leaves the group. In this illustrative case, the key update messages will be sent by the KS as several multicast messages and as one unicast message. The KS encrypts the new session key K' using the key K1 and transmits this message to the multicast group G1. This message reaches the group members m4, m5, m6 and m7. Note that members m2 and m3 also receive this message (e.g., if they are in the promiscuous mode since otherwise a multicast message to G1 will be filtered at the link layer of m2 and m3) even though m2 and m3 are not subscribed to the group G1 since they are on the same subnet as m4; but then these nodes will not be able to decrypt this message.

(For reference, in a promiscuous mode, a network device typically intercepts all packets including those not intended for the node in question and reads each network packet that arrives in its entirety. On the other hand, when a data packet is transmitted in a non-promiscuous mode, devices essentially listen to the data to determine if the network address included in the data packet is theirs. For example, a node or device may read header information in the packet to identify the destination address, while not capturing or analyzing the content of the data packet. If the destination address is not associated with that node or with a device associated with that node, the data packet is passed onto the next device until the device with the correct network address is reached. That correct device will then receive and read the actual data. In this manner, a node can easily determine if it is the last routing node within a network path. For example, in order to determine if the node is the last routing node within a network path, it can compare the destination address with an address list of devices associated with that node.)

In this context, the foregoing results in two exposures of the message, one to m2 and the other to m3. In addition, the KS also encrypts K' using the key K01 and transmits this message to the multicast group G01. This reaches the members m2 and m3 which can determine the new session key. Note also that this message is exposed to the member m4 even though m4 is not subscribed to received messages sent to G01 since m4 is on the same subnet as m2 and m3. Finally, member m0 gets the new session key when the KS unicasts the new session key encrypted using the key K000. Thus, when member m1 left the group, the KS updated the session key by sending two multicast messages and one unicast message. Some of these messages were exposed to members that were not in the receiver set of the corresponding multicast group as explained.

While the TI scheme will ensure that multicast revocation messages are sent only to subnets containing members with subscriptions to the corresponding multicast group, it will not prevent the revocation messages from being visible to other members that happen to be physically located in the same subnet as is clear from the example earlier. Eliminating the visibility of such revocation messages motivated the design of the topology dependent (TD) scheme shown in FIG. 2(B).

With respect to the topology dependent (TD) scheme shown in FIG. 2(B), the logical tree mirrors the physical topology. Thus, in addition to the multicast group G, a router is associated with, e.g., log (r) additional multicast groups (where r is the number of router subnets). For example, router 1 is a member of G00, G0, router 2 is a member of G01 and G0, router 3 is a member of G10 and G1, and router 4 is a member of G11 and G1. Further, there is a one-to-one correspondence between leaf multicast addresses and routers: e.g., leaf multicast address G00 maps to router 1 and is the only leaf multicast address at that router. The number of multicast groups in this case is determined purely by the number of subnets and is independent of the number of participating members. In the context of the TD scheme, the degree or arity (e.g., the number of branches therefrom) of subtrees rooted at nodes corresponding to leaf multicast nodes may be different from the degree of the rest of the tree. The degree of these subtrees is determined by the number of members of the group present in the corresponding router subnet, while the degree of the rest of the key tree is fixed a priori.

Now, when any member leaves the group, then in this case many more unicast messages could be generated as compared to the TI scheme. Thus, when m1 departs from the group, there will be two multicast messages sent to groups G1 and G01 containing the new session key in an encrypted form and one unicast message sent to m0, which is the same as in case of the TI scheme. However, on the other hand, if m2 leaves the group, then there will be 2 unicast messages (e.g., to m3 and m4) and 2 multicast messages to update the session key, which is one more unicast message as compared to the use of the TI scheme.

It is noted that each unicast message also leads to exposure on the subnet assuming that other nodes on the subnet are listening in a promiscuous fashion. Thus, the TD scheme, while confining the visibility of key update messages to the intended members, can cause a significant increase in the number of unicast key update messages transmitted within a subnet. The number of such unicast revocation messages rises with member density in a subnet.

On the other hand, with reference to FIG. 2(C), the topology incorporated (TC) scheme attempts to reduce the number of such unicast revocation messages, while minimizing (but not necessarily eliminating) the visibility of multicast revocation messages outside of their destination member sets. As shown in FIG. 2(C), in this case, the logical tree incorporates but does not mirror the physical topology. For the illustrative example given in FIG. 2(C), there is shown a router 1 subscribed to G00 and G0, a router 2 subscribed to G010, G01, G0 and G011, a router 3 subscribed to G10 and G1, and a router 4 that is subscribed to G11 and G1. There is a one-to-many correspondence between routers and leaf multicast addresses: leaf multicast addresses are fully contained within router subnets. Thus, G010 and G011 are only present at router 2. Now, in this third case, if member m2 leaves the group, then the key update will be done using three multicast messages (sent to G1, G00 and G011) and one unicast message sent to m3.

ILLUSTRATIVE EXAMPLES AND RESULTS

The present inventors have compared the performance of illustrative schemes according to the preferred embodiments described herein with two additional schemes:

The first additional scheme (O) is the original scheme where all multicast revocation messages are sent to the global multicast address subscribed to by all members. This is not shown in the figure. Thus, in this case, every router needs to subscribe to only one multicast group. At the same time this scheme has performance and security problems associated with it as explained earlier.

The second additional revocation or key update scheme, Unicast (U), considers the case where multicast capabilities are not available at the router node as mentioned earlier. This corresponds to the portion of the 3GPP UMTS (Universal Mobile Telecommunications System) standard dealing with multicast services. As per the 3GPP standard, multicast services are terminated at the GGSN (Gateway GPRS support node) which can be considered to correspond to the router of the subnet. A multicast message destined for one or more UMTS terminals will be translated into several unicast messages destined for each of these terminals.

Figure 1:
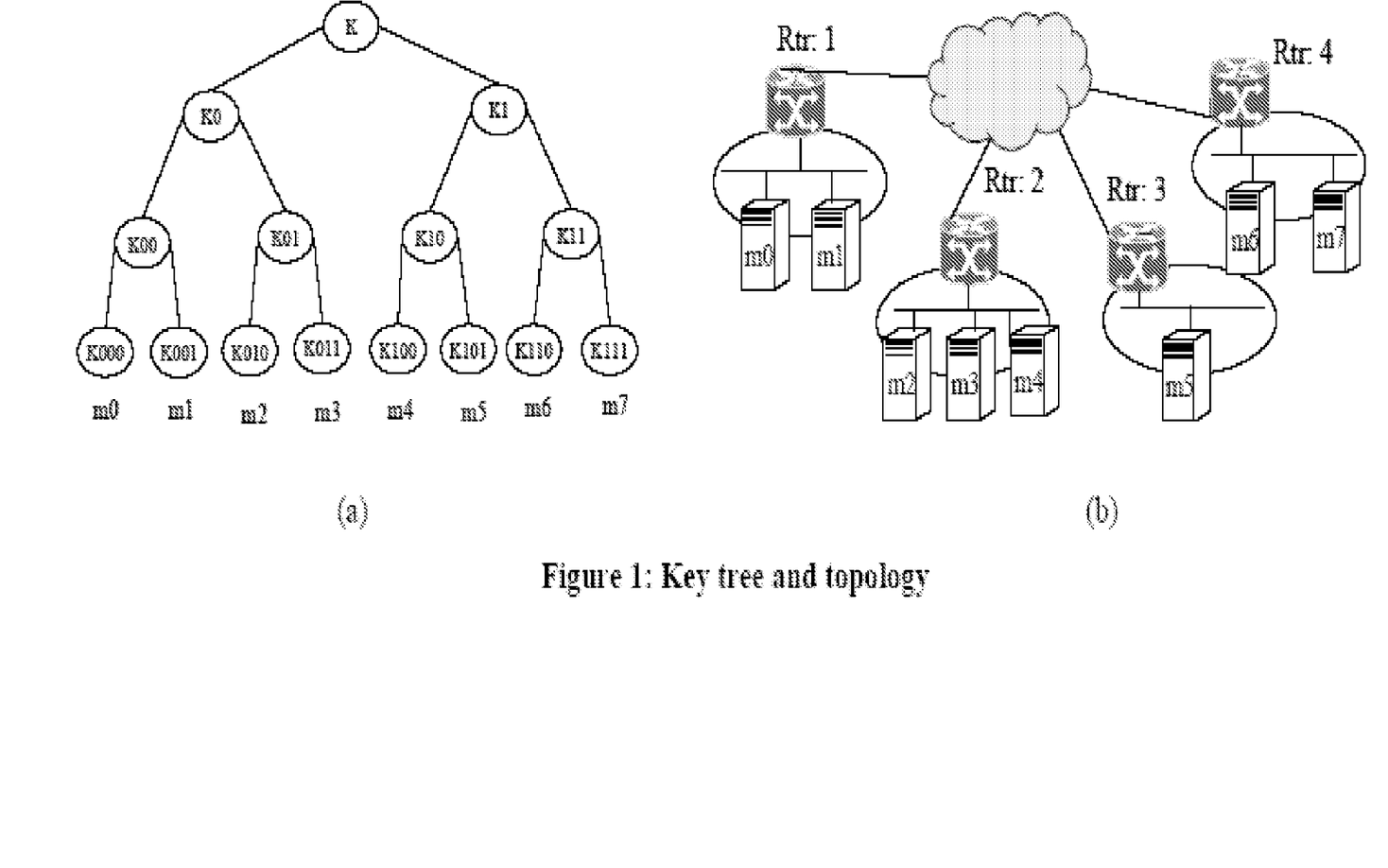
FIGS. 1(A) and 1(B) show an illustrative Key Tree and Topology.

To quantify the efficacy of these schemes, three metrics were employed:

Exposures: A message is considered as being "exposed" to a member if the message is visible on the broadcast subnet of the member and the member is not in the (unicast or multicast) destination set of the message. For example, in FIG. 1, a multicast revocation message sent to G01 is exposed to member m4. Similarly, a unicast revocation message sent to member m4 is exposed to members m2 and m3. The number of such message exposures averaged over all possible revocations in a given key tree is the value of the exposure metric for the tree. It essentially gives a measure of security implications of the key update messages generated within the physical subnets. Note that this metric is motivated by a desire to prevent an outsider from collecting encrypted data and using it for cryptanalysis. As explained earlier, this is important irrespective of the fact that modern block ciphers are resistant to such attacks since, e.g., the mode of operation can introduce weakness. The exposure metric is very relevant for bandwidth constrained 3G networks. A scheme that has a small value for this metric will generate less traffic in a given subnet. This metric is also of significance in the context of broadcast networks, such as, e.g., WLANs. Minimizing this metric minimizes the vulnerability of a symmetric key to cryptographic attacks.

Multicast Groups per Subnet: This is defined as the average number of multicast groups at each router (not including the overall multicast group). This measures the amount of multicast states the router needs to maintain.

Revoke Messages: This is defined as average number of messages required for revocation. Each scheme requires the generation of unicast revocation messages in addition to multicast revocation messages: both types of messages are captured by this metric. Thus, this metric measures the overhead of the revocation scheme itself. Minimizing this metric is also desirable when dealing with networks where the bandwidth on the last hop link is constrained.

The present inventors developed a tool to facilitate the study of the various schemes described in the previous section. This tool, written in C, allows the simulation of each scheme and collects the metrics described above. The simulation tool takes as input the number of physical subnets, the number of members, the degree desired for the logical key tree and the scheme being simulated. It proceeds by randomly distributing members among the various subnets. Currently, the uniform distribution function have been employed in such simulations. Once member distribution is completed, a logical key tree is computed using the desired scheme. The performance of each of the schemes are then investigated by simulating member departure. Towards this end, each member is made to depart in turn and the metrics are computed corresponding to the departed member. Then, the member who was made to leave earlier is restored and the same is repeated for the next member, and so on. Finally, the metrics are averaged across all the members. Thus, the metrics are computed for every member with the final value of the metric being generated by averaging across all the members.

The performance of the various schemes were studied as a function of the number of members, number of subnets and degree of the tree (e.g., binary=2, ternary=3, etc.). We next look at each of these factors individually.

A. Varying Number of Multicast Group Members

Figure 3A:
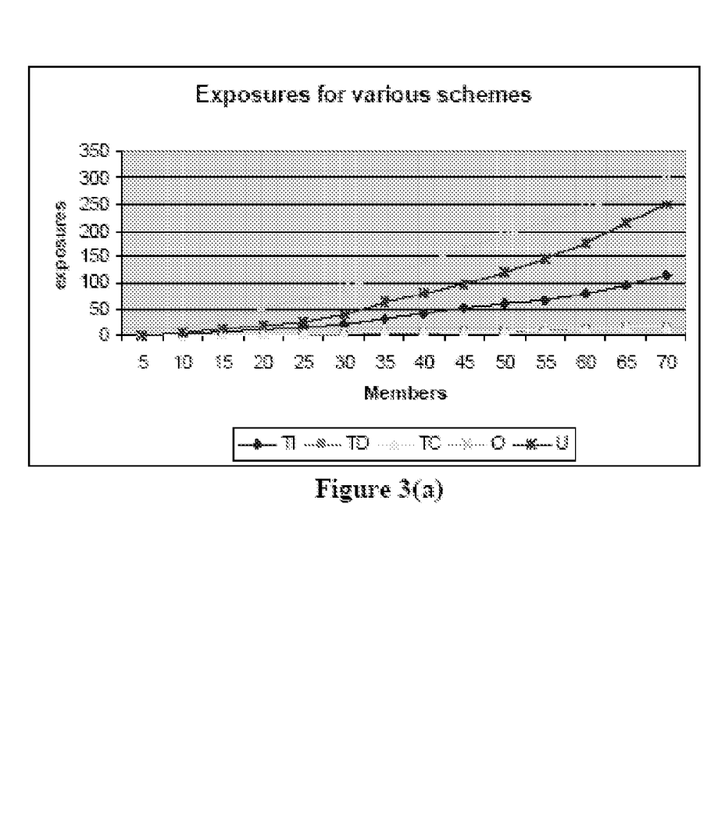
FIG. 3(A) is a chart showing illustrative exposures for various schemes.
Figure 3B:
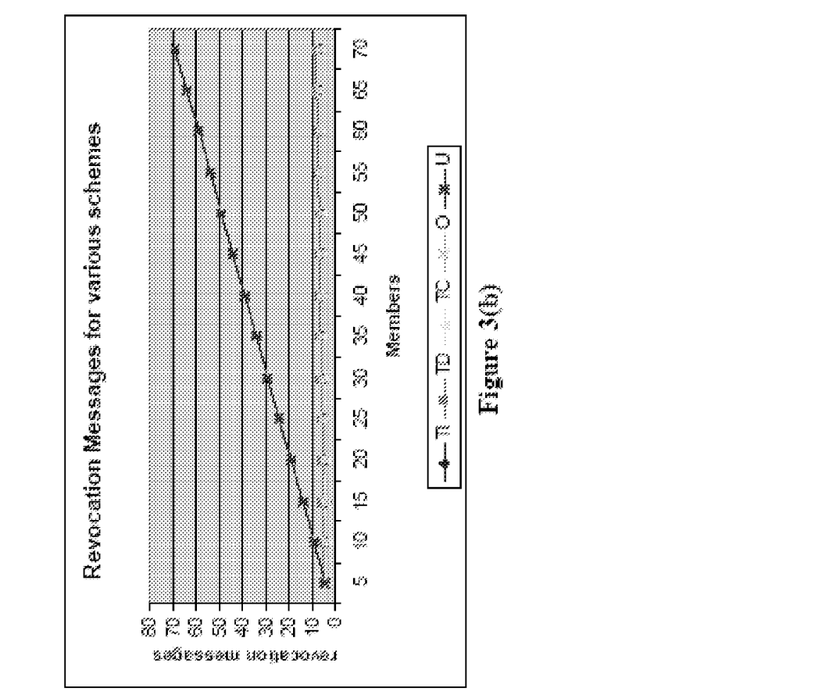
FIG. 3(B) is a chart showing illustrative revocation messages for various schemes.

To examine the effects of varying the number of group members, we consider a binary tree (degree=2) and 20 subnets among which the group members will be distributed, as an illustrative and non-limiting example. The members of the multicast group are uniformly distributed amongst these 20 subnets. The performance of the five schemes in terms of the metrics given earlier is shown in FIGS. 3(A) and 3(B). The number of members are plotted on the x-axis. In this figure, we show the results for small group sizes (up to 70 members in the group).

We first consider FIG. 3(A) where the exposure metric is plotted on the y-axis. We see that the O scheme has the highest number of exposures for small group sizes. TI has higher number of exposures than TD. TC performs as well as TD in this case. When the size of the multicast group increases (we do not show these figures for lack of space), it has been seen that TI will have less number of exposures as compared to TD. This is because the number of unicast revocations is small (unicast revocations are the only exposed messages for TD) for smaller group sizes. But, as the group size increases, the number of unicast revocations becomes large thus raising the number of exposures for TD. TC performs as well as TD for small number of members and better than both schemes for larger group sizes since it has fewer unicast revocations than TD and tries to keep multicast groups within fewer subnets than TI. Scheme U performs better than O because all messages in the former are unicast to the destination member. Thus, although each unicast message results in exposures within the physical subnet, this is still better than multicasting the messages to all the members. However, as the number of members increases beyond about 1000 (not shown in figure), the number of unicast messages in scheme U exceeds the number of multicast messages required by any of the other schemes. As a result, scheme U incurs the maximum number of exposures for large member sets. Thus, TC is recommended since it is oblivious to the number of members in the group and has the best performance in terms of number of exposures.

We next look at the number of revocation messages that need to be sent in FIG. 3(A). In this case, the performance of O, TI, and TC schemes are comparable. TD does slightly worse than both for a small number of members and much worse for a large number of members (based on results with >200 members, not shown due to space limitations) because of the large number of unicast revoke messages generated in this scheme. Further, the increase in revoke messages is linear for TD on account of many unicast messages, while in case of the O, TI and TC schemes the increases are logarithmic because of the nature of the tree topology. Scheme U generates the most revocation messages since all messages are unicast. In fact, for a group of n members, this latter scheme will generate n−1 unicast revocation messages. In FIG. 3(C), we look at the number of multicast groups per subnet. This metric is zero by definition for the O scheme. For the TD scheme, we see that this is constant since, in this scheme, this metric is determined purely by the number of subnets which is fixed at 20. It rises sharply for the TI scheme as more members show up. Note that this metric is initially lower for TI as compared to TD since its assumed that subnets in the TD scheme will receive revoke messages whether they have members or not. This can be optimized if the GC detects empty subnets. TC does better than TI but cannot outperform TD since the latter limits leaf level multicast groups to one while the number of leaf level multicast groups is determined by the number of group members for scheme TC. Since scheme U unicasts all messages, the number of multicast groups to be stored in the router node for the subnet will always be zero.

Based on this, the TC scheme is recommended to be considered since it has minimal exposures as well as revocation messages irrespective of the size of the multicast group. The number of multicast groups that each router has to register for is though higher but can be justified given the fact that this number is not very high. Note also that the unicast scheme (which would be the case for 3G networks) leads to large number of revocation messages. The number of exposures in this scheme is also quite high.

B. Varying Number of Subnets

Figure 4A:
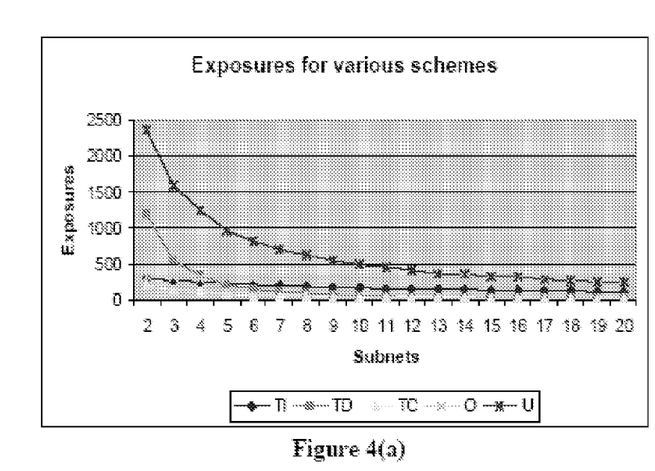
FIG. 4(A) is another chart showing illustrative exposures for various schemes.
Figure 4B:
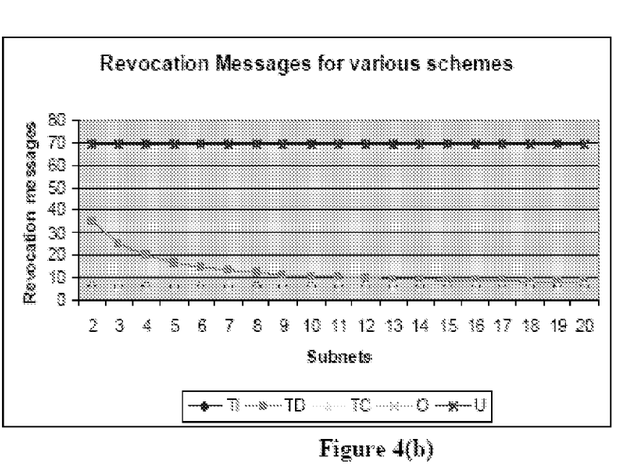
FIG. 4(B) is another chart showing illustrative revocation messages for various schemes.
Figure 4C:
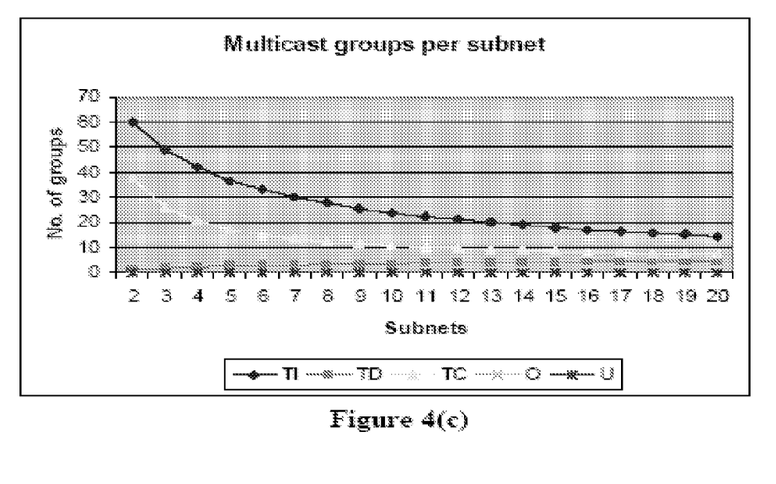
FIG. 4(C) is a chart showing various multicast groups per subnet.

Next, the case with a varying number of subsets is considered. In this regard, we consider, by way of example, binary trees and a group with 70 members. When the number of subnets is varied, then these 70 members are uniformly distributed among subnets. The performance of the five schemes is shown in FIGS. 4(A) to 4(C). We plot the number of subnets constituting the multicast group on the x-axis.

We first look at exposures in FIG. 4(A). In this case, increasing the number of subnets reduces the number of exposures for all the schemes. The performance of the O scheme is relatively flat and it does worse than all the others because all messages are exposed to all members, increasing subnets does not impact this. The TI scheme improves slightly as the number of subnets increases since the number of members per subnet decreases causing the number of members to whom messages can be exposed to decrease. The TD scheme has lot of exposures for small number of subnets while it does much better as the number of subnets increases because all the exposures are due to unicast messages within a subnet. This reduces as the members are spread over a larger set of subnets. TC outperforms TI and performs comparably with TD as the number of subnets increase. Exposures in TC are due to multicast messages which are confined within subnets to the extent possible. As the number of subnets increase the number of multicast groups per subnet decrease, thus reducing the number of exposures. Scheme U's performance is the worst here because it uses exclusively unicast messages. The reduction in exposures occurs because members are more sparsely distributed as the number of subnets increases.

The number of revocation messages (FIG. 4(B)) is nearly flat for the O scheme as well as for the TI and the TC schemes. This is because the number of members is fixed. On the other hand, this metric decreases for the TD scheme since more subnets imply fewer unicast revoke messages within a subnet as members get distributed uniformly within the subnets. This metric is also flat for Scheme U since the total number of unicast revoke messages will always be 69 (one less than the number of members).

We next consider the number of multicast groups that every subnet router has to register for (FIG. 4(C)). This is constant (equal to zero) for the O and U schemes. For TI this number is larger than for any of other schemes. For the TD scheme, this metric shows a steady rise as the number of subnets increases since the total number of multicast groups is determined by the number of subnets. Note that in the TI scheme since the number of multicast groups is determined purely by the number of members, the total number of groups remains fixed. Introducing more subnets will disperse them better thus reducing the per subnet average. However, the averages are lower for the TD scheme since the total number of multicast groups will be lower when computed based on subnets than when based on the number of members as number of members is greater than the number of subnets. The TC scheme does much better than the TI scheme since it tries to confine multicast groups within subnets. However, it cannot outperform the TD scheme since total multicast groups for TC are also based on number of members.

An important implication of the results in this section will be for 3G networks. As explained earlier, a current proposal is for the GGSN to be the multicast router in 3G networks. Reference 2 discusses possible variations of this scheme with multicast services being terminated at the RNC (Radio Network controller) in one case and at the Node-B (Base station) in another. The number of subnets will be more when Node-B is the point of multicast termination while it will be the least when GGSN is the point of multicast termination given the same number of members. Thus, even if the current set of 3G devices are not modified for multicast capability, it is definitely desirable to have the multicast termination point in 3G networks to be at Node-B.

With respect to multicasting in 3GPP networks, the entire contents of each of the following 3GPP standards documents are incorporated herein by reference: 1) 3GPP TS 22.146, entitled 3GPP Multimedia Broadcast Multicast Service Stage-1 and 2) 3GPP TS 23.246 (V6.10.0 (2006-06)), entitled 3GPP Multimedia Broadcast Multicast Service, Architecture and Functional description. The MBMS service described in the above-referenced documents involves an IP datacast type of service that can be offered via, e.g., existing GSM and UMTS cellular networks. Among other things, the MBMS infrastructure allows for using an uplink channel for the interactions between a service and a user. In practice, multicast users need a return channel for the interaction procedures in order to be able to subscribe to certain desired services. Among other things, MBMS does not interfere with, e.g., already existing GSM and UMTS services, and mobile devices not supporting MBMS will work in networks that offer MBMS for customers with MBMS capabilities. Moreover, the MBMS infrastructure allows for a multicast mode that uses radio resources efficiently by using a common radio channel.

Figure 6A:
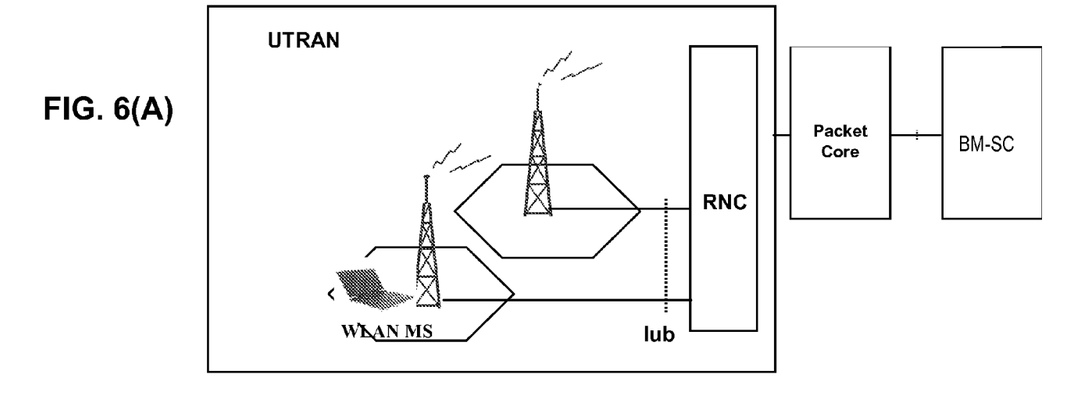
FIG. 6(A) shows an illustrative architectural diagram with a Broadcast Multicast Serving Center of 3GPP MBMS architecture.
Figure 6B:
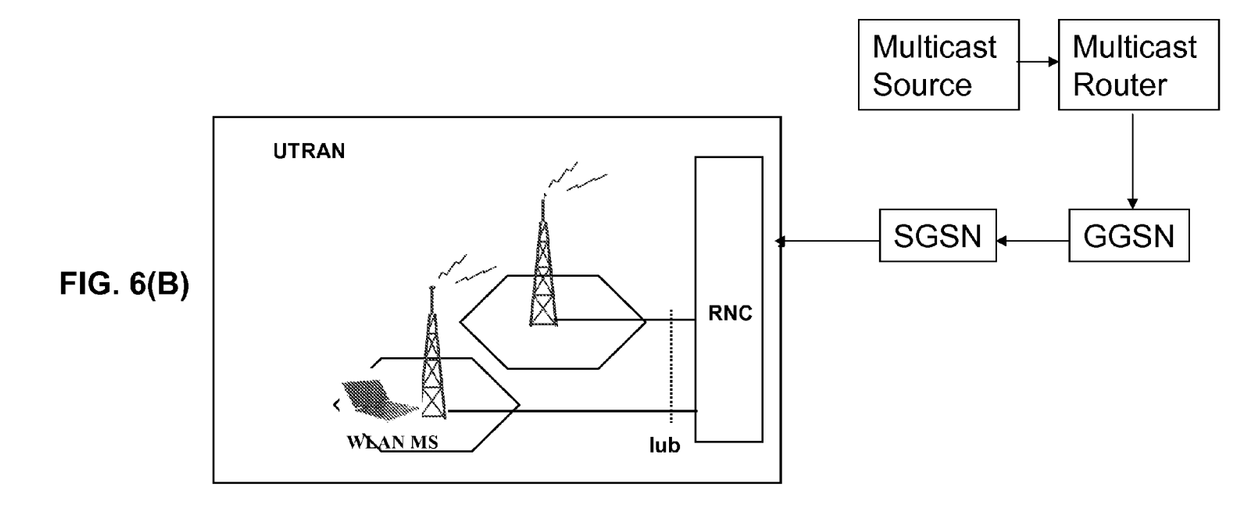
FIG. 6(B) shows an illustrative multicast traffic path architecture before MBMS.

To facilitate reference, FIG. 6(A) shows an illustrative architectural diagram with a Broadcast Multicast—Serving Center of 3GPP MBMS architecture, and FIG. 6(B) shows an illustrative multicast traffic path architecture before MBMS.

C. Varying Degree

Figure 5A:
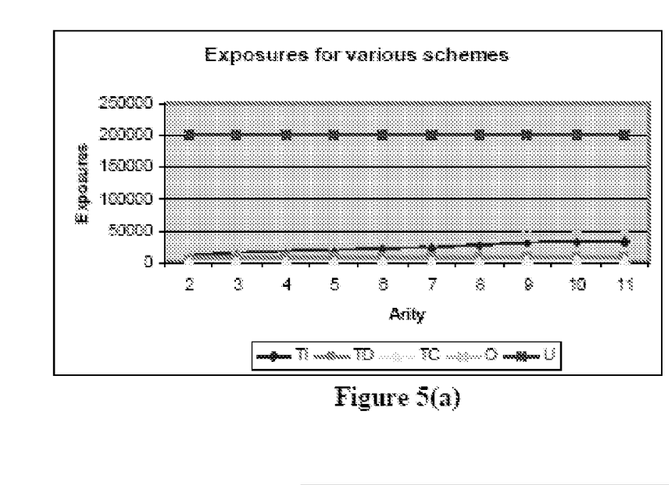
FIG. 5(A) is another chart showing illustrative exposures for various schemes.
Figure 5B:
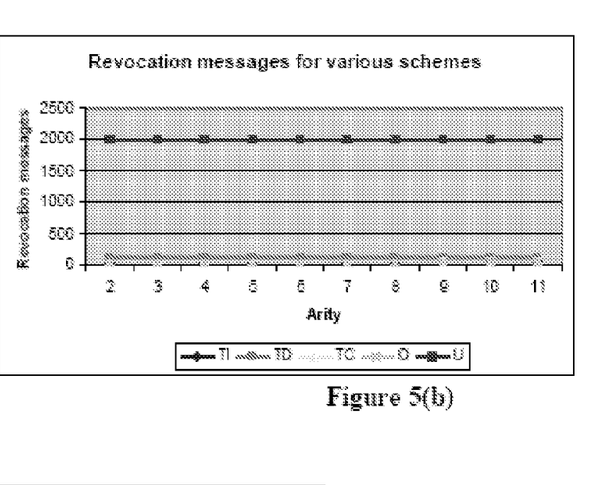
FIG. 5(B) is another chart showing illustrative revocation messages for various schemes.

Here, we consider 20 subnets and 2000 members who are uniformly distributed among the subnets. The degree of the key tree is varied. Note that this is the degree of the key tree above the node corresponding to the leaf multicast address. We plot the degree of the key tree on the x-axis. We show the performance in terms of the exposure metric in FIG. 5a. Scheme U has the worst performance with a flat number of exposures. The number of exposures is flat in this case because the number of revocation messages (which are all unicast) does not vary with the degree of the tree. O does much better than U but still much worse than the other schemes. This is because all multicast messages are exposed to all members and increasing degree only increases the number of unicast message exposures in scheme O. Further, this metric shows a steady increase for the TI scheme since a degree increase implies more members per multicast group and therefore more unicast message exposures. Further, this is flat for the TD scheme since exposures occur only with unicast messages sent to members of a leaf level multicast group, varying the degree does not impact the number of unicast messages. Finally, the TC scheme outperforms the TI and the TD schemes in our data range. All the schemes other than U show a steady increase for this metric since the number of unicast revocations (and therefore exposures) increases with degree.

We next consider the performance of these schemes when considering the revocation messages. For scheme U, this metric is flat since the number of revocation messages is fixed for a fixed set of members. It shows a steady rise for the rest of the schemes. Performance of the O scheme is identical to the TI scheme since they use the same set of revocation messages. Further, the performance is better than TD for both the TI and the TC schemes. As degree increases, the height of the multicast tree decreases thus increasing the number of revoke messages required at each level of the tree. Since multiple leaf multicast groups can be in a subnet for the TI and the TC schemes, the number of unicast revoke messages is lower relative to the TD scheme which allows exactly one leaf multicast group per subnet.

Figure 5C:
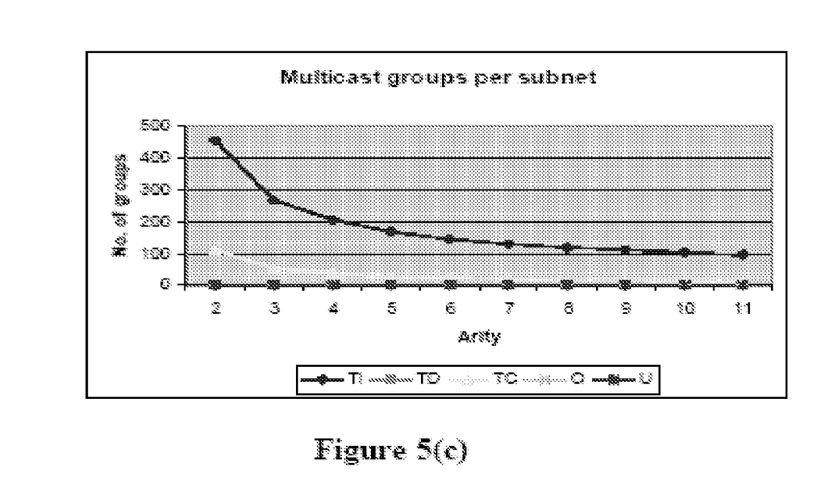
FIG. 5(C) is another chart showing various multicast groups per subnet.

We consider the number of multicast groups per subnet in FIG. 5(C). As earlier, this equals zero for the O and U schemes. This decreases and is very low for the TD scheme since the total is determined by the number of subnets which is much less than the number of members. This also decreases for TI since higher degree implies lower height of the multicast tree and therefore fewer total multicast groups. Further, the TC scheme outperforms TI since multicast groups are confined to subnets as much as possible.

Among other things, the present inventors have examined the problem of performing key revocations for multicast applications in a topology sensitive manner as an enhancement to previous approaches where revocations were performed agnostic of the last hop topology. Significant savings in terms of messaging overhead are seen at the cost of additional multicast state overhead.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method of managing multicast key distribution, comprising:
associating a multicast address with each internal node of a key tree;
creating the key tree based on a last hop topology in which each router of a subnet subscribes to multicast groups that correspond to the various nodes in the key tree, in which the physical topology of the key tree is independent of the mapping of the nodes to each of the router of the subnet such that at least one of said multicast groups directly corresponds to members belonging to a plurality of subnets via the router;
sending multicast revocation messages by a key server only to the multicast addresses corresponding to internal nodes of the key tree subscribed to by members belonging to said plurality of subnets other than those subnets from which at least one of the member has left; and
sending unicast revocation messages only to the members of the subnets from which at least one of the member has left,
wherein the multicast revocation messages sent to the multicast groups having correspondence to the members within the plurality of subnets are not prevented from being visible to a member that does not subscribe to the destination multicast address.

2. The method of claim 1, wherein a top level multicast group (G) is used to transmit data and to update the key when a member joins while other multicast groups are used for updating session keys when one or more member leaves the subnet subscribed to the multicast group.

3. The method of claim 1, wherein the key tree mirrors the last hop topology.

4. The method of claim 1, wherein each of the router of the subnet is associated with log (r) additional multicast groups, where r is the number of router subnets.

5. The method of claim 1, further including:
performing key revocations by sending multicast revocation messages only to subnets containing subscriptions to the multicast groups,
wherein a last hop of a network based on the last hop topology includes wireless links, such as cellular network or WLANs.

6. The method of claim 5, wherein the last hop in the network incorporates multicast capabilities in cellular and 3G.

7. A method of managing multicast key distribution, comprising:

associating a multicast address with each internal node of a key tree, creating the key tree based on a topology dependent (TD) scheme and a last hop topology, using the topology dependent scheme to subscribe each last hop router connected to a subnet to form a one-to-one correspondence between the multicast address belonging to an internal node and the last hop router of the subnet, in which the use of the last hop topology ensures that the each last hop router connected to the subnet subscribes to multicast addresses corresponding to internal nodes of the key tree that are parents of the corresponding internal node whose multicast address is assigned to the last hop router, sending multicast revocation messages by a key server only to the multicast addresses corresponding to internal nodes of the key tree subscribed to by members belonging to each of the plurality of subnets subscribing to the multicast groups other than those subnets from which at least one of the member has left, and sending unicast revocation messages only to the members of the subnets from which at least one of the member has left, wherein said topology dependent scheme prevents the visibility of revocation messages to non-subscribing members that are physically located outside of subnets containing members with subscriptions to the multicast group corresponding to internal nodes in the key tree.

8. The method of claim 7, wherein a number of multicast groups are determined by a number of subnets in a network and are independent of a number of participating members in each of the subnets.

9. The method of claim 7, wherein the degree of subtrees is determined based on a number of members of the group present in a corresponding router subnet, while the degree of the other portions of the key tree is fixed a priori.

10. A method of managing multicast key distribution, comprising:

associating a multicast address with each internal node of a key tree, creating the key tree based on the last hop topology, in which each last hop router of a subnet subscribes to multicast groups that correspond to the various internal nodes in the key tree;

configuring at least one last hop router among a plurality of last hop routers so that members belonging to the subnet connected to said one last hop router receiving multicast or unicast revocation messages directly from a plurality of said multicast groups via said one last hop router;

wherein the key tree is based on a topology incorporated (TC) scheme that incorporates but does not mirror the physical topology so that there is a one-to-many correspondence between the members of at least one subnet and multicast addresses of the internal nodes attached to said one subnet via the last hop router and wherein the multicast addresses are fully contained within router subnets;

sending multicast revocation messages by a key server only to the multicast addresses corresponding to internal nodes of the key tree subscribed to by members belonging to each of a plurality of subnets subscribing to the multicast groups other than those subnets from which at least one of the member has left;

and sending unicast revocation messages only to the members of the subnets from which at least one of the member has left;

wherein said topology incorporated scheme reduces a number of unicast revocation messages, while minimizing a visibility of multicast revocation messages outside of their destination member sets.

* * * * *